United States Patent [19]
Van Haag

[11] Patent Number: 5,033,317
[45] Date of Patent: Jul. 23, 1991

[54] APPARATUS FOR ASCERTAINING THE MAGNITUDE OF STRESSES UPON THE BEARINGS FOR ROLLS IN CALENDERS AND LIKE MACHINES

[75] Inventor: Rolf Van Haag, Kerken, Fed. Rep. of Germany

[73] Assignee: Kleinewefers GmbH, Krefeld, Fed. Rep. of Germany

[21] Appl. No.: 498,089

[22] Filed: Feb. 22, 1990

[30] Foreign Application Priority Data

Mar. 25, 1989 [DE] Fed. Rep. of Germany ....... 3909911

[51] Int. Cl.[5] .................. G01L 1/02; G01M 13/04
[52] U.S. Cl. .................. 73/862.54; 73/862.58; 29/116.2; 384/448
[58] Field of Search ........... 73/862.07, 862.45, 862.47, 73/862.54, 862.55, 862.58, 37.5, 37.9; 384/99, 448, 114, 118; 340/682; 29/116.2; 72/17; 100/170

[56] References Cited

U.S. PATENT DOCUMENTS

| | | | |
|---|---|---|---|
| 2,836,061 | 5/1958 | Deavers | 73/862.58 |
| 2,908,164 | 10/1959 | Bamber | 73/147 |
| 4,041,779 | 8/1977 | Greb | 73/862.45 |
| 4,291,447 | 9/1981 | Marchioro | 29/116.2 |
| 4,299,162 | 11/1981 | Hartmann et al. | 100/170 X |
| 4,625,637 | 12/1986 | Pav et al. | 100/47 |
| 4,848,119 | 7/1989 | Pav et al. | 29/116.2 X |
| 4,944,609 | 7/1990 | Salter, Jr. et al. | 384/448 X |

FOREIGN PATENT DOCUMENTS

| | | |
|---|---|---|
| 2818011 | 10/1979 | Fed. Rep. of Germany . |
| 3026865 | 8/1981 | Fed. Rep. of Germany . |
| 362207 | 12/1972 | U.S.S.R. ............ 73/862.54 |

Primary Examiner—Charles A. Ruehl
Attorney, Agent, or Firm—Peter K. Kontler

[57] ABSTRACT

The cylindrical internal surfaces of inner races of antifriction bearings between the end portions of a deformable shell and the stationary carrier for the shell in a roll for use in calenders surround with some clearance the adjacent cylindrical external surfaces of the carrier. The magnitude of stresses between the pairs of internal and external surfaces is monitored by several sensors at least some of which have pockets machined into the respective internal and/or external surface. The pockets receive a pressurized hydraulic fluid which leaks along paths defined by the respective pair of surfaces to be collected in a tank. An evaluating system monitors the pressure in the pockets and serves to regulate the pressure of supplied fluid and/or the hydrostatic or other supporting elements between the carrier and the shell.

24 Claims, 5 Drawing Sheets

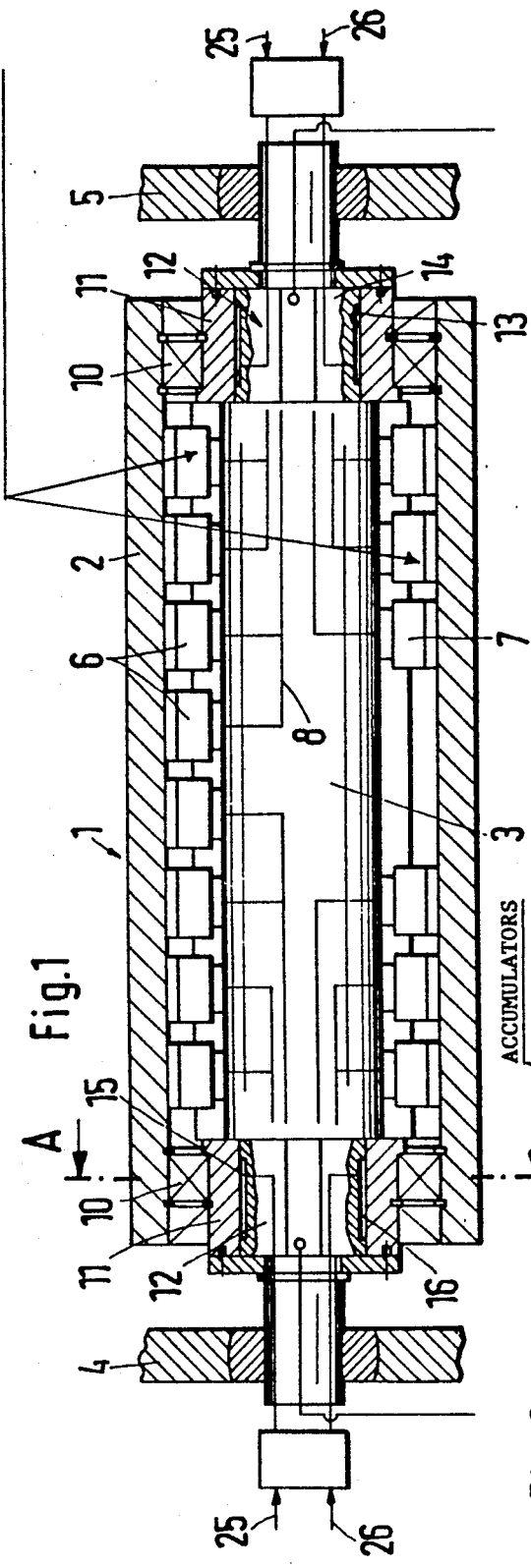
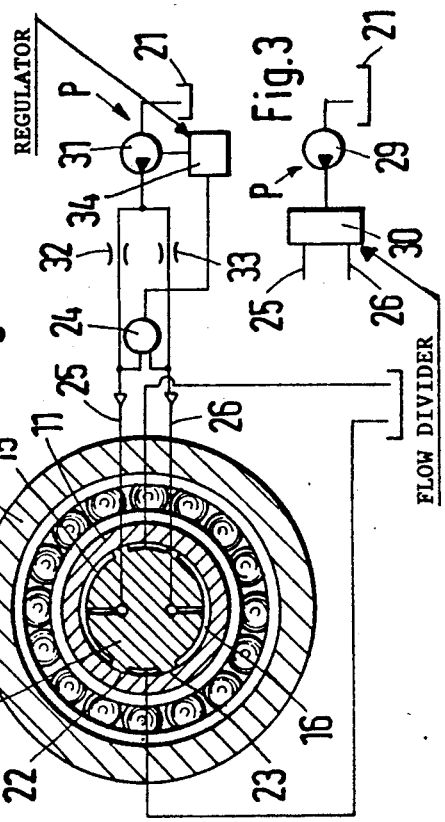
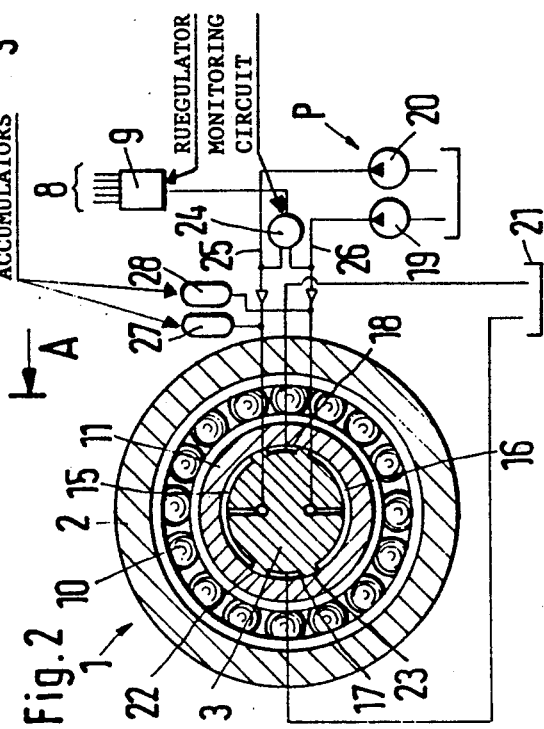

APPARATUS FOR ASCERTAINING THE MAGNITUDE OF STRESSES UPON THE BEARINGS FOR ROLLS IN CALENDERS AND LIKE MACHINES

BACKGROUND OF THE INVENTION

The invention relates to improvements in apparatus for ascertaining the magnitude of stresses upon bearings, such as antifriction ball or roller bearings which are used in the rolls of calenders and like machines.

Commonly owned U.S. Pat. No. 4,625,637 granted Dec. 2, 1986 to Pav et al. discloses a roll assembly for use in calenders and like machines. The magnitude of stresses upon bearings between the end portions of a stationary carrier and a deformable cylindrical shell which is rotatable relative to and surrounds the carrier is ascertained by an apparatus which employs several sensors in the form of force, pressure, displacement or distance transducers which are recessed into the peripheral surface of the carrier or into the internal surface of the inner race of the respective bearing. An evaluating circuit is provided to process signals which are supplied by the transducers. The patented apparatus operates satisfactorily; however, the cost of such apparatus is relatively high and the sensors must be inspected, repaired and/or replaced at rather frequent intervals because they are often subjected to pronounced stresses. Moreover, the laying of conductors for transmission of signals from the transducers to the evaluating circuit is a complex, costly and time-consuming procedure. Replacement of a transducer, or of two or more transducers, takes up much time and entails a prolonged deactivation of the machine.

OBJECTS OF THE INVENTION

An object of the invention is to provide a novel and improved apparatus which is simpler and requires less maintenance than heretofore known apparatus for ascertaining the magnitude of stresses between bearings and their supports, particularly in the rolls of calenders and like machines.

Another object of the invention is to provide novel and improved sensors for use in the above outlined apparatus.

A further object of the invention is to provide an apparatus wherein the sensors are less affected by pronounced stresses than the sensors of heretofore known apparatus.

An additional object of the invention is to provide a roll which embodies or is combined with one or more apparatus of the above outlined character.

Still another object of the invention is to provide an apparatus which is particularly suited for use in calenders or other machines wherein the bearings for use in rolls or other rotary parts are likely to be subjected to pronounced stresses.

A further object of the invention is to provide the apparatus with novel and improved means for conveying fluids to and from the sensors between neighboring cylindrical internal and external surfaces.

Another object of the invention is to provide an apparatus wherein the sensors need not be connected with signal evaluating means by electrical conductors.

SUMMARY OF THE INVENTION

The invention resides in the provision of an apparatus for ascertaining the magnitude of stresses acting upon a bearing wherein a substantially cylindrical internal surface is substantially coaxial with and surrounds with clearance a substantially cylindrical external surface, particularly in a calender roll wherein a deformable shell surrounds a stationary carrier. The apparatus comprises a plurality of sensors including first and second sensors disposed between the two surfaces substantially diametrically opposite each other. Each sensor includes a plenum chamber and at least one plenum chamber includes at least one pocket or recess which is provided in at least one of the surfaces. The apparatus further comprises means for supplying pressurized fluid to the plenum chambers of the sensors. The surfaces define a path for evacuation of fluid from the at least one pocket, and the apparatus further comprises means for monitoring the pressure of fluid in the chambers. The apparatus can also comprise means for collecting the fluid which leaves the at least one pocket along the aforementioned path.

Each plenum chamber can include at least one pocket, and the surfaces then define paths for evacuation of fluid from the pockets. Since the pockets of the at least two plenum chambers are disposed substantially diametrically opposite each other, the cross-sectional area of the path for evacuation of fluid from the pocket of one of the sensors increases when the cross-sectional area of the other path decreases as a result of radial displacement of one of the surfaces relative to the other surface or vice versa in a direction from one of the sensors toward the other sensor.

The other plenum chamber can constitute a cylinder chamber, and the respective sensor then further comprises a piston which is reciprocable in the cylinder chamber. The fluid supplying means of such apparatus preferably includes means for admitting pressurized fluid into the cylinder chamber to thereby bias the piston (preferably with a constant force) against one of the surfaces.

Each plenum chamber preferably includes at least one pocket, and the effective area of one of the pockets preferably equals or at least approximates the effective area of each other pocket.

The fluid supplying means preferably includes at least one source of hydraulic fluid. Furthermore, the fluid supplying means can be designed to deliver to each plenum chamber a predetermined quantity of fluid per unit of time. For example, the fluid supplying means can comprise a discrete positive displacement pump for each plenum chamber having at least one pocket. Alternatively, the fluid supplying means can comprise a positive displacement pump and flow divider means between the outlet of the pump and the plenum chambers. Still further, the fluid supplying means can include a source of pressurized fluid and flow restrictors which are interposed between the source and each of the sensors. The two surfaces produce a first throttling action upon the fluid which flows along the aforementioned path when the two surfaces are coaxial, and the flow restrictors preferably produce a more pronounced second throttling action.

It is presently preferred to maintain the two surfaces in predetermined angular positions relative to each other, i.e., the two surfaces can be stationary or can rotate at the same speed. The external surface can be provided on a non-rotatable carrier for a deformable cylindrical shell which surrounds the carrier, and the internal surface can be provided in a race which non-rotatably surrounds the carrier and forms part of a bearing (such as an antifriction ball or roller bearing) between the carrier and the shell.

The at least one surface can be provided with a fluid collecting groove which at least partially surrounds the pocket, and the path then extends between the pocket and the groove which latter is or can be connected to the aforementioned collecting means. The pocket can have a substantially circular outline, and the groove then preferably constitutes an annulus which surrounds and can be concentric with the pocket.

At least one of the two surfaces can be provided with at least one groove which defines a portion of the path and serves to supply evacuated fluid to the collecting or receiving means.

In accordance with a presently preferred embodiment of the apparatus, each plenum chamber has a pocket and at least one of the two surfaces has grooves which alternate with the pockets in the circumferential direction of the surfaces. The surfaces define discrete paths for evacuation of fluid from the pockets and each groove defines a portion of one of the paths.

Each pocket can have a polygonal outline, for example, a square or rectanglar outline.

In accordance with another presently preferred embodiment of the apparatus, there are four sensors which are substantially equidistant from each other in the circumferential direction of the two surfaces, and the chambers of at least two sensors have pockets. The monitoring means of such apparatus can include a first monitoring device having means for monitoring the pressure in the chambers of two of the four sensors, and a second monitoring device with means for monitoring the pressure in the chambers of the other two sensors.

An accumulator can be connected with each pocket.

The apparatus can further comprise adjustable means for regulating the stresses which act upon the surfaces, and the monitoring means can include means for adjusting the regulating means in dependency upon the monitored pressure. The adjustable regulating means can include one or more sets of hydrostatic or other supporting elements between the aforementioned carrier and shell.

It is further possible to employ fluid supplying means having at least one adjustable source of pressurized fluid (e.g., a pump), and the monitoring means of such apparatus can include means for adjusting the source in dependency upon the monitored pressure.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is a partly elevational and partly axial sectional view of a calender roll wherein the magnitude of stresses upon each of the antifriction bearings between a stationary carrier and the end portions of a rotary cylindrical shell is ascertained by an apparatus embodying one form of the invention;

FIG. 2 is a transverse sectional view as seen in the direction of arrows from the line A—A of FIG. 1;

FIG. 3 illustrates a portion of a modified apparatus having different fluid supplying means;

FIG. 4 is a transverse sectional view similar to that of FIG. 2 but showing an apparatus having third fluid supplying means;

DESCRIPTION OF PREFERRED EMBODIMENTS

Figure 5:
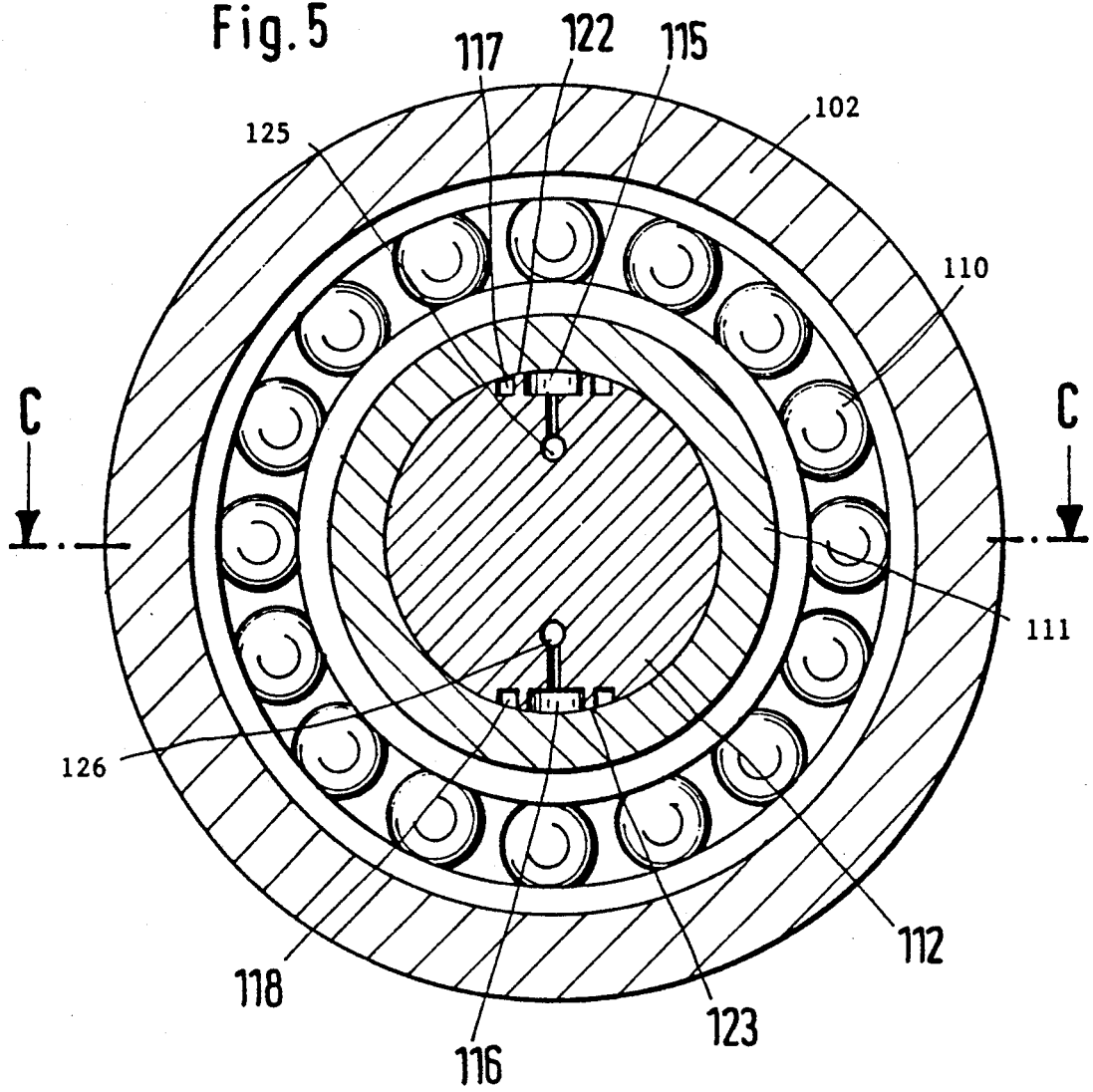
FIG. 5 is a transverse sectional view similar to that of FIG. 2 but showing another apparatus, the section being taken in the direction of arrows as seen from the B—B of FIG. 6.

Referring first to FIGS. 1 and 2, there is shown a roll 1 having a deformable hollow cylindrical shell 2 and a stationary non-rotatable elongated carrier 3 which is surrounded by the shell and has end portions mounted in spherical bearings provided therefor in two spaced apart stationary frame members 4, 5. The means for deforming selected portions of the shell 2 comprises a first set of hydrostatic supporting elements 6 which form a row extending in parallelism with the common axis of the shell and carrier 3, and a second set of hydrostatic supporting elements 7 which are disposed diametrically opposite the set of supporting elements 6. The supporting elements 6, 7 receive a pressurized fluid by way of channels 8 which are provided therefor in the carrier 3. The pressure of fluid in the channels 8, and hence the extent of deformation of selected portions of the shell 2, is determined by a regulator 9 in a manner not forming part of the present invention. Reference may be had to numerous United States and foreign patents of the assignee of the present application.

The end portions of the shell 2 are mounted on antifriction bearings 10 (e.g., roller or ball bearings) each of which has a sleeve-like inner race 11 which non-rotatably surrounds the adjacent portion 12 of the carrier 3. Each inner race 11 has a cylindrical internal surface 13 which is a loose fit or clearance fit on the adjacent cylindrical external surface 14 of the respective carrier portion 12. The play between each pair of surfaces 13, 14 suffices to permit a certain amount of radial movability of the inner races 11 relative to the respective portions 12 of the carrier 3. As mentioned above, the inner races 11 are held against rotation with reference to the carrier.

The improved apparatus serve to ascertain the magnitude of stresses which develop between the internal surfaces 13 and the respective external surfaces 14 when the roll 1 is in use. Each apparatus comprises two sensors having plenum chambers 15, 16 in the form of pockets or recesses which are machined into or otherwise formed in the respective external surface 14. The pockets 15, 16 are disposed diametrically opposite each other in line with the transmission of force from the shell 2 upon a web of paper or other material which is to be calendered in the nip of the illustrated roll 1 and a second calender roll (not shown). Reference may be had to the aforementioned commonly owned U.S. Pat No. 4,635,637 which shows pairs of cooperating rolls as well as an entire roll assembly with a large number of rolls including rolls with and without deformable shells.

The pockets 15, 16 alternate with two axially parallel grooves 17, 18 which are also machined into the respective external surface 14 and serve to define portions of paths for evacuation of streams of hydraulic fluid which are pumped into the pockets 15 and 16. The grooves 17, 18 discharge evacuated fluid into a collecting or receiving vessel 21.

The vertical plane which halves the pockets 15, 16 and includes the axes of the shell 2 and carrier 3 also halves the nip of the shell 2 with the adjacent roll which is disposed above or below the roll 1 of FIGS. 1 and 2.

The fluid supplying unit P of each apparatus comprises a positive displacement pump 19, 20 for each of the two pockets 15, 16 and conduits 26, 25 which connect the pumps 19, 20 with the corresponding pockets (16 and 15, respectively). Each pocket receives a constant stream of pressurized hydraulic fluid, i.e., identical quantities of pressurized fluid per unit of time.

The surfaces 13, 14 define discrete paths for the flow of fluid from the pockets 15, 16 into the collecting or receiving vessel 21. Portions of such paths are defined by the aforementioned grooves 17, 18 and additional portions of such paths are defined by the clearances 22, 23 between the ends of the pockets 15, 16 and the adjacent grooves 17, 18. The width of the clearances 22 increases and the width of the clearances 23 decreases if the inner race 11 of FIG. 2 is moved upwardly relative to the respective portion 12 of the carrier 3, and the width of the clearances 22 decreases (while the width of the clearances 23 increases) if the race 11 is moved downwardly relative to the fixedly mounted carrier. Otherwise stated, the throttling action of surfaces 13, 14 upon the flow of fluid from the pocket 15 into the grooves 17, 18 along the clearances 22 increases if the surface 13 is moved downwardly, and the throttling action of surfaces 13, 14 upon the fluid flowing from the pocket 16 into the grooves 17, 18 along the clearances 23 increases if the surface 13 is moved upwardly. As the throttling action in the clearances 22 increases, the pressure of fluid in the pocket 15 rises, and the pressure of fluid in the pocket 16 rises when the throttling action in the clearances 23 increases. The differences between the pressures in the pockets 15, 16 are ascertained by a monitoring circuit 24 which is connected with the conduits 25, 26 between the outlets of the respective pumps 20, 19 and the corresponding pockets 15, 16.

The conduits 25, 26 are further connected with accumulators 27, 28 which contain supplies of pressurized fluid and produce a desirable damping action.

The output of the monitoring circuit 24 is connected with the regulator 8 to influence the hydrostatic supporting elements 6 and/or 7 in a sense to maintain the stresses upon the respective bearing 10 at a selected value, e.g., at zero value.

Any and all forces which act upon the exterior of the shell 2 result in the development of reaction forces in the antifriction bearings 10. Such reaction forces act upon the respective inner races 11 which tend to move radially relative to the respective portions 12 of the carrier 3. When an inner race 11 is not subjected to the action of external stresses (reaction forces), it is acted upon only by pressurized fluid in the respective pair of pockets 15, 16 (the plenum chamber of each sensor can include two or more pockets in the surface 13 and/or 14). When a reaction force develops, it tends to increase the clearances 22 between the pocket 15 and the grooves 17, 18 or the clearances 23 between the pocket 16 and the grooves 17, 18. The resulting pressure differential counteracts the reaction force. Thus, the difference between the pressures of fluid in the pockets 15 and 16 can be utilized as an indicator of the magnitude of the external force and of the reaction force that has caused a shift in the radial position of the surface 13 relative to the respective surface 14. The monitoring circuit 24 transmits corresponding signals to the means for supplying pressurized fluid to some or all of the supporting elements 6 and/or 7 in order to compensate for the externally applied forces and the resulting reaction forces acting upon one or both races 11. Since the rate of admission of pressurized fluid into the pockets 15, 16 is constant but preferably variable, it is possible to hydrostatically counteract large forces or stresses upon the bearings 10.

The pocket 15 and/or 16 between each pair of surfaces 13, 14 can be provided in the surface 13 and/or 14. Moreover, and as already mentioned above, each plenum chamber (i.e., each of the two sensors between a pair of surfaces 13, 14) can have two or more pockets. An advantage of the improved apparatus is that they need not employ separately produced mechanical, electrical or other sensors which must be installed between the bearings and the carrier at a considerable cost and which must be connected with external monitoring means by way of conductors and the like. The pockets 15, 16 of the sensors between the inner races 11 and the carrier 3 of the roller 1 are permanently installed and require no maintenance and/or frequent inspection. The apparatus of FIGS. 1 and 2 are much less sensitive to damage and are much less prone to malfunction than conventional apparatus which employ separately produced and subsequently installed sensors. All that is necessary is to establish paths for the flow of fluid to and from the pockets 15, 16 of each apparatus, and this can be done in a manner which is customary in rolls for calenders or like machines, e.g., to supply pressurized fluid to the hydrostatic supporting elements between the carrier and the deformable shell. Furthermore, it is not necessary to install parts of the monitoring means in the roll proper and/or in the respective bearings, i.e., all that is necessary is to monitor the pressure in the conduits 25, 26 which supply pressurized fluid to the pockets 15 and 16. As already described above, the pressure in the conduits 25, 26 changes if the position of the respective race 11 with reference to the carrier 3 changes so that monitoring of pressure in the conduits 25, 26 is tantamount to monitoring of the pressure in the pockets. This renders it possible to ascertain the magnitude of the reaction force by the simple expedient of ascertaining the difference between the pressures in the conduits 25 and 26. Furthermore, it is very simple to ascertain whether or not the magnitude of forces acting upon a bearing 10 is zero, i.e., the pressure in the conduit 25 then matches the pressure in the conduit 26. The width of clearances 22 and 23 should be selected in such a way that the throttling action in these clearances is sufficiently pronounced to influence the pressure in the pockets 15 and 16. As a rule, it suffices to establish a loose fit or clearance fit between each pair of neighboring surfaces 13 and 14.

The distribution of pockets 15, 16 and clearances 22, 23 in a manner as shown in FIG. 2 has been found to contribute significantly to sensitivity of the apparatus. The reason is that, when the distribution of pockets and clearances is selected in a manner as shown in FIG. 2, the width of the clearances 22 increases when the width of the clearances 23 decreases and vice versa, i.e., the pressure in the pocket 15 rises when the pressure in the pocket 16 drops and the other way around. The resulting pronounced difference between the pressures in the pockets 15, 16 (i.e., in the conduits 25 and 26) can be monitored with a high degree of accuracy. Moreover, each such apparatus is effective irrespective of whether the the shell 2 is acted upon from above or from below, i.e., in either of two directions diametrically opposite each other.

The effective area of the pocket 15 preferably equals or closely approximates the effective area of the associated pocket 16. This renders it possible to employ a relatively simple monitoring circuit 24 because such circuit is merely called upon to ascertain the difference between the pressures in the conduits 25 and 26.

While it is possible to operate with air or another gas, it is presently preferred to employ a hydraulic fluid, for example, oil which is employed in the hydrostatic supporting elements 6 and 7. The utilization of a hydraulic fluid renders it possible to achieve pronounced pressure drops in the clearances 22 and 23, i.e., to maintain the bodies of hydraulic fluid in each of the pockets 15, 16 at an elevated pressure. This, in turn, contributes to the accuracy of measurements and to the generation of pronounced supporting forces between the carrier 3 and the bearings 10. Moreover, the cushions of hydraulic fluid between the surfaces 13 and 14 produce a desirable vibration damping action.

Though it is possible to employ the improved apparatus to ascertain stresses acting upon bearings wherein one of the neighboring surfaces 13, 14 rotates relative to the other surface, such apparatus can be used with particular advantage in connection with bearings wherein the internal surface does not or cannot turn relative to the external surface and/or vice versa. This ensures that hydrodynamic effects and those variations of the width of clearances 22, 23 which are attributable to rotation of one of the surfaces relative to the other surface cannot affect the accuracy of the monitoring action.

The accumulators 27, 28 constitute an optional but highly advantageous feature of the improved apparatus because they produce a desirable vibration damping action in the regions of the respective bearings.

The exact nature of connections between the output or outputs of the monitoring circuit 24 and of the means for controlling the pressure in the supporting elements 6 and 7 forms no part of the invention. All that counts is to ensure that signals at the output or outputs of the signal monitoring circuit 24 can be used to alter the pressure of fluid in one or more hydrostatic or other supporting elements 6 and/or in one or more hydrostatic or other supporting elements 7 whenever the differential between the pressures in the pockets 15, 16 (i.e., between the conduits 25, 26) reaches a selected value.

FIG. 3 shows that the means P for supplying pressurized fluid to the pockets 15, 16 via conduits 25, 26 can comprise a single fluid source in the form of a positive displacement pump 21 which can draw fluid from the vessel 21 (i.e., that fluid which is returned by flowing along the paths defined by the respective surfaces 13 and 14) and delivers pressurized fluid to a flow divider 30 having two outlets, one for the conduit 25 and the other for the conduit 26.

The fluid supplying means of FIG. 3 is simpler than the fluid supplying means of FIG. 2. The operation of the pump 29 can be such that the conduits 25, 26 receive identical volumes of fluid per unit of time and that the fluid is supplied at a constant rate.

Each of the pumps 19, 20 of FIG. 2 and each outlet of the flow divider 30 of FIG. 3 preferably delivers a fluid stream having a predetermined volume per unit of time. This ensures that the pressure of fluid in each of the pockets 15, 16 varies in dependency upon the throttling action in the respective clearances 22 and 23. As a rule, or at least in many instances, the rate of flow of pressurized fluid from the pumps 19, 20 or from the flow divider 30 to the respective pockets 15, 16 is constant. However, it is equally possible to alter the rate of delivery of pressurized fluid, for example, in order to cause the apparatus to operate within a different measuring range.

The apparatus which is shown in FIG. 4 employs fluid supplying means P which comprises a positive displacement pump 31 serving to supply pressurized fluid to the conduits 25, 26 by way of discrete flow restrictors 32 and 33. The throttling action of the flow restrictors 32 and 33 is more pronounced than that in the clearances 22 and 23 when the inner race 11 is exactly coaxial with the adjacent portion 12 of the carrier 3.

The monitoring or evaluating circuit 24 ascertains the difference between the pressures in the conduits 25, 26 and transmits appropriate signals to a regulator 34 which controls the operation of the pump 31. The arrangement is such that signals from the monitoring circuit 24 via regulator 34 can alter the pressure and/or the rate of flow of fluid which is discharged by the outlet of the pump 31.

The flow restrictor 32 and the surfaces bounding the corresponding clearances 22 together constitute a first pressure divider, and a second pressure divider is formed by the flow restrictor 33 in conjunction with the surfaces bounding the clearances 23. The pressure dividing ratio varies in response to changes of the position of the inner race 11 relative to the adjacent portion of the carrier 3.

The throttling action of the flow restrictors 32, 33 is preferably constant. On the other hand, the throttling action of the associated second flow restrictors (at 22 and 23) varies in dependency upon changes in the position of the internal surface of the race 11 with reference to the external surface of the carrier 3 and/or vice versa. Since the pressure of fluid which is supplied by the pump 31 is normally constant, variations of throttling action at 22 and 23 determine the pressure in the pockets 15, 16 and hence the characteristics of the signal or signals at the output of the monitoring circuit 24.

The feature that the throttling action of flow restrictors 32, 33 is more pronounced than the throttling action at 22 and 23 is desirable and advantageous because this ensures that the two surfaces are not subjected to pronounced pressures when the shell 2 is not subjected to external stresses.

An advantage of the regulator 34 is that it can influence the desired value of stresses upon the respective bearing. Thus, the regulator 34 can control the pump 31 in such a way that the pressure in the pockets 15, 16 is maintained at a predetermined value as a result of appropriate changes of pressure at the outlet of the pump 31 and/or by changing the rate of fluid flow to the pockets. This enables the bearing to influence the shape of the adjacent portion of the shell 2. The shape of other portions of the shell can be influenced by the other bearing and by the supporting elements 6 and/or 7.

All of the heretofore described embodiments share the feature that the entire shell 2 is caused to float on a cushion of pressurized fluid, i.e., not only in the region of the hydrostatic supporting elements 6 and 7 but also in the region of the bearings 10. This, especially in combination with the damping action of the accumulators 27 and 28, ensures a highly desirable damping of the shell 2 with reference to the frame members 5.

Figure 6:
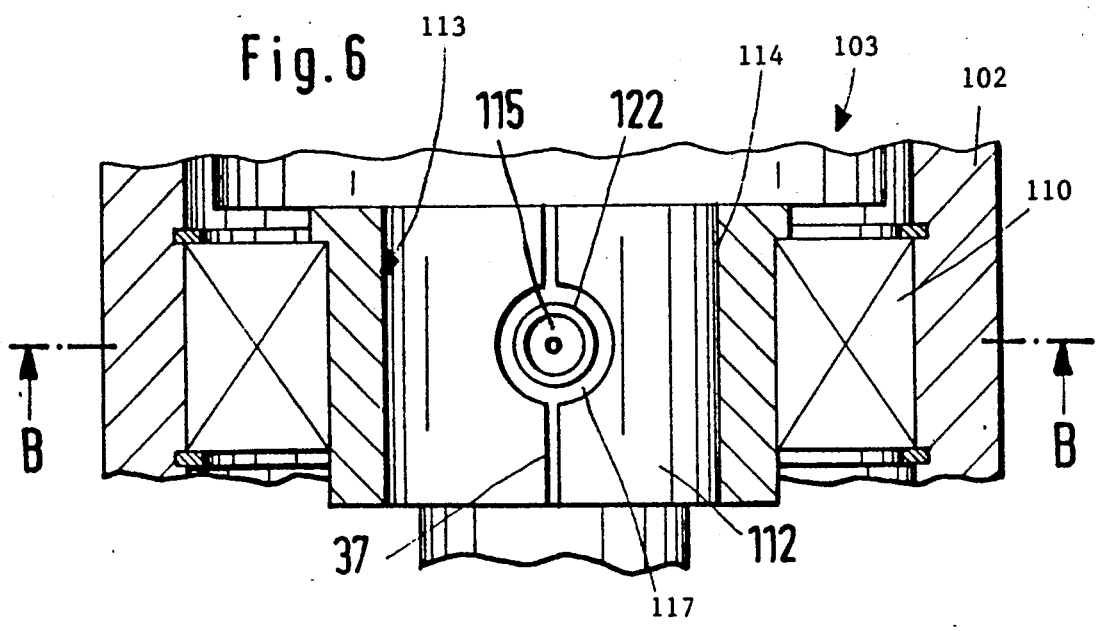
FIG. 6 is a fragmentary axial sectional view as seen in the direction of arrows from the line C—C of FIG. 5.

FIGS. 5 and 6 show an apparatus wherein all such parts which are identical with or clearly analogous to corresponding parts of the apparatus of FIGS. 1 and 2 are denoted by similar reference characters plus 100. The external surface 114 of the carrier portion 112 is provided with two pockets 115, 116 which are again disposed diametrically opposite each other and each of which has a circular outline. The grooves 117, 118 are annuli which are concentric with and surround the respective pockets 115, 116. The clearances 122, 123 are annular clearances which extend between the pockets 115, 116 and the respective grooves 117, 118. The illustrated portions of the conduits 125, 126 are channels which are machined into or otherwise formed in the carrier 103. An axially extending groove 37 in the external surface 114 communicates with the annular groove 122 to deliver fluid to the collecting or receiving vessel 21 (not shown in FIGS. 5 and 6). A similar axially parallel groove is provided to connect the vessel 21 with the annular groove 123.

The plane which includes the axis of the carrier 103 and divides the pockets 115, 116 also includes the nip or nips of the shell 102 with the adjacent roll or rolls. This ensures that the extent to which the width of the clearance between the surfaces 113 and 114 varies in actual use of the roll reaches a maximum value in the region of the pockets 115, 116, i.e., in the region of the clearances 122, 123. In other words, the rate at which the pressure in the pockets 115, 116 varies is more pronounced than if these pockets were angularly offset with reference to the illustrated positions.

The apparatus of FIGS. 5 and 6 is capable of furnishing highly accurate measurements denoting the difference between the pressures in the pockets 115 and 116. The pockets 115, 116 and the associated grooves 117, 118 can have a non-circular outline. However, circular pockets and annular grooves which are concentric with the respective circular pockets are preferred at this time because they even further enhance the accuracy of measurements and render it possible to adjust one or more supporting elements 6 and/or 7 (not shown in FIGS. 5 and 6) with an even higher degree of accuracy.

Figure 7:
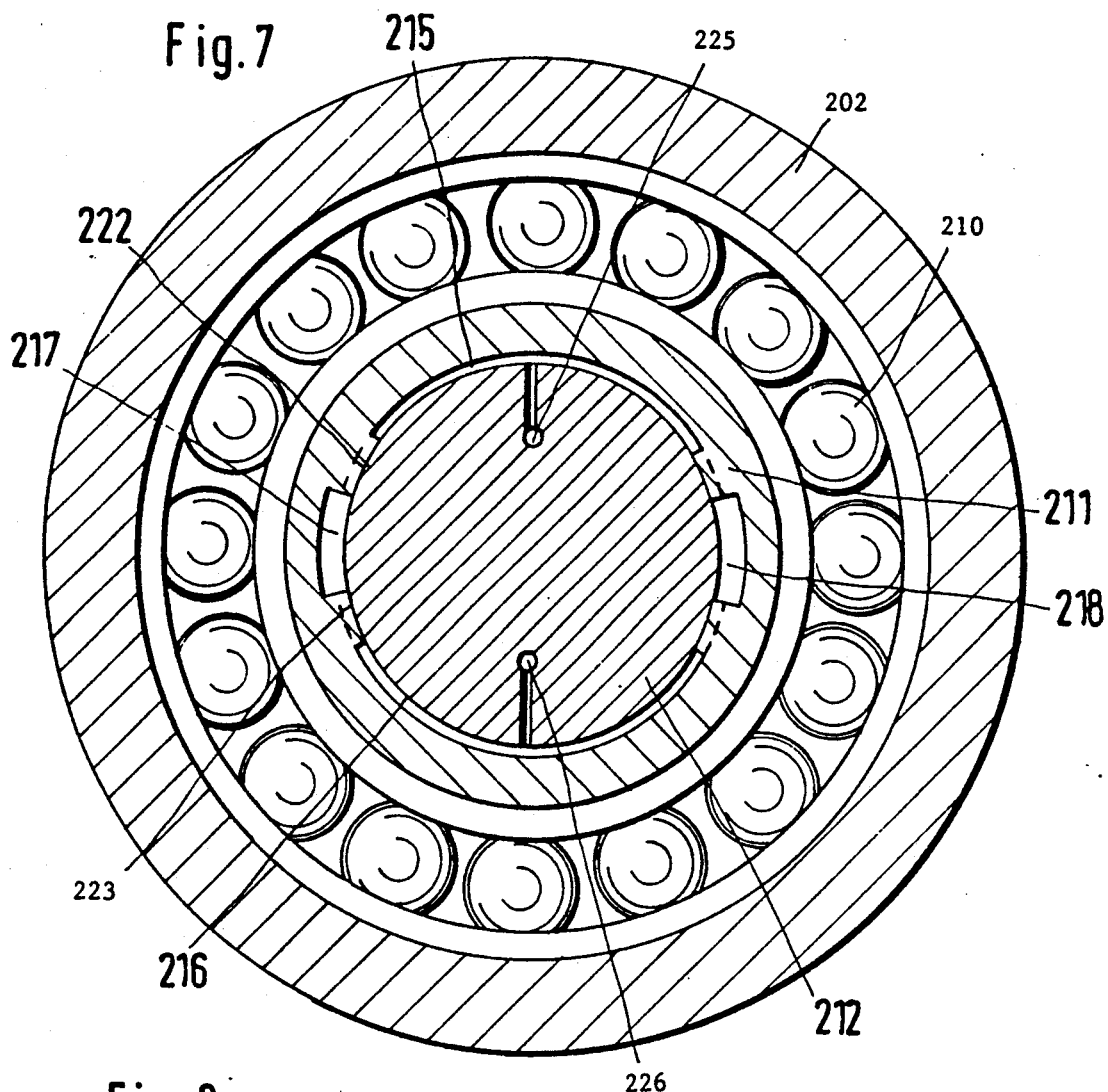
FIG. 7 is a transverse sectional view similar to that of FIG. 5 but showing the sensors of a further apparatus.
Figure 8:
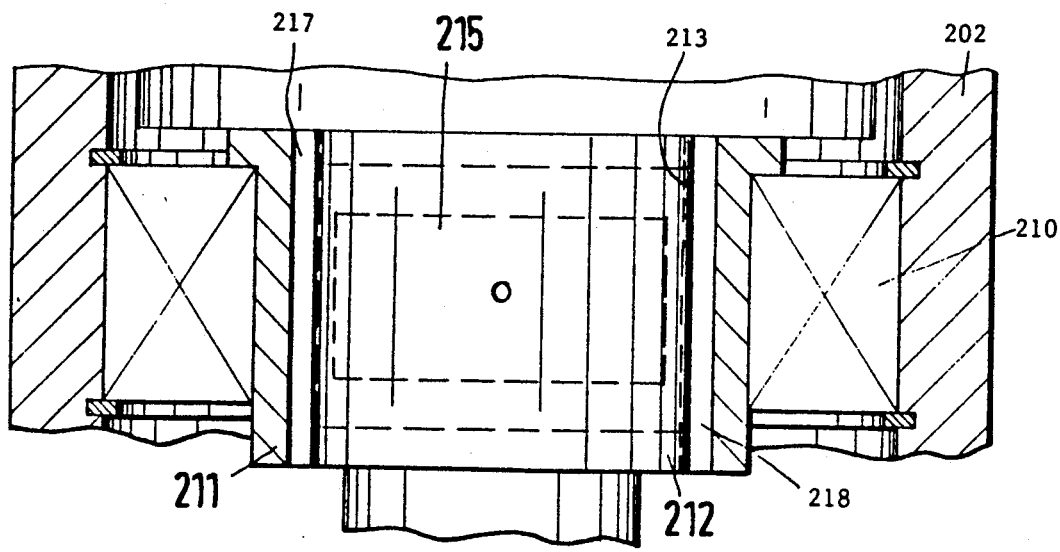
FIG. 8 is a fragmentary axial sectional view of the shell, bearing and carrier which are shown in FIG. 7.

FIGS. 7 and 8 show a portion of a further apparatus. All such parts which are identical with or clearly analogous to the corresponding parts of the apparatus of FIGS. 1 and 2 are denoted by similar reference characters plus 200. The pockets 215 and 216 have a polygonal (preferably a square or rectangular) outline and alternate with axially parallel grooves 217, 218. Each of the pockets 215, 216 has a large effective area, i.e., each such pocket can extend along an arc well in excess of 90 degrees. This renders it possible to take up pronounced bearing forces.

The pockets 215, 216 and the grooves 217, 218 are provided in the internal surface 213 of the inner race 211.

The apparatus of FIGS. 7 and 8 can be used with advantage in rolls wherein the bearings must be subjected, or are expected to be subjected, to pronounced stresses.

Figure 9:
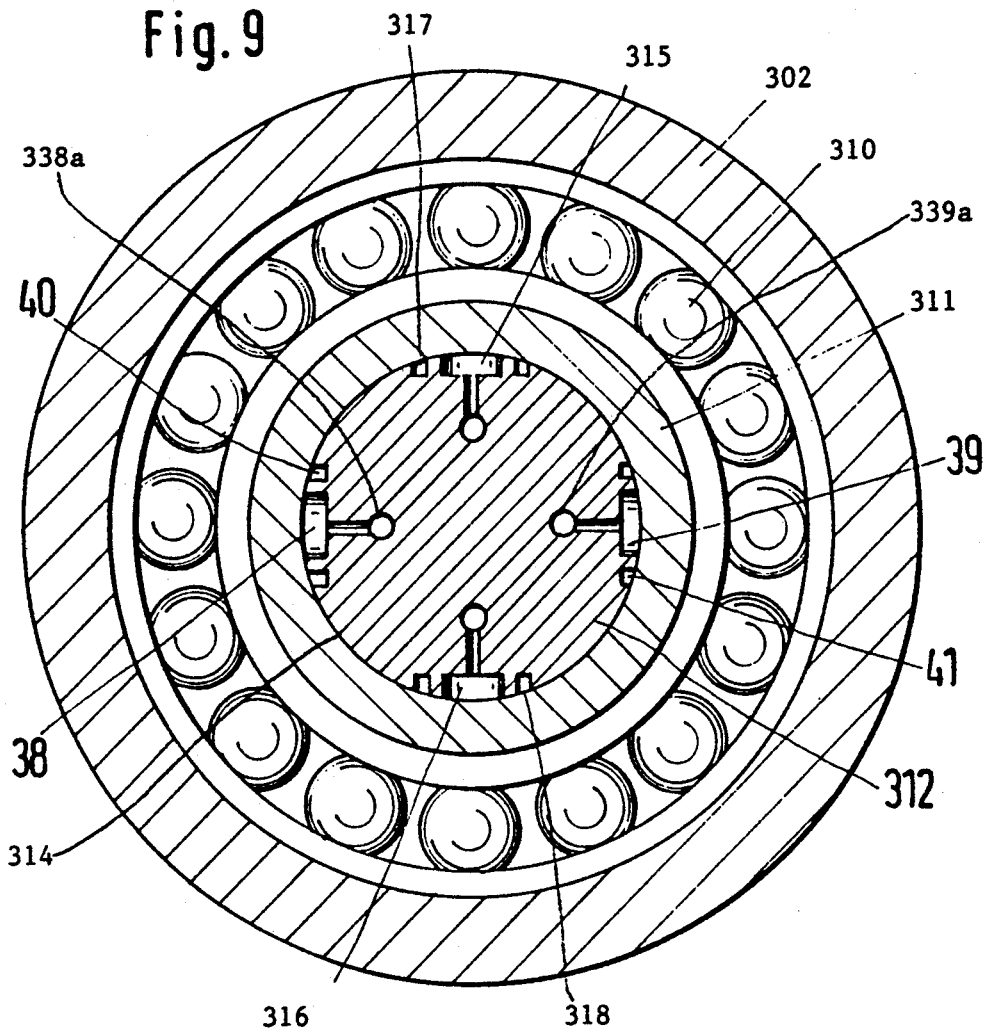
FIG. 9 is a sectional view similar to that of FIG. 7 but showing a set of different sensors.
Figure 10:
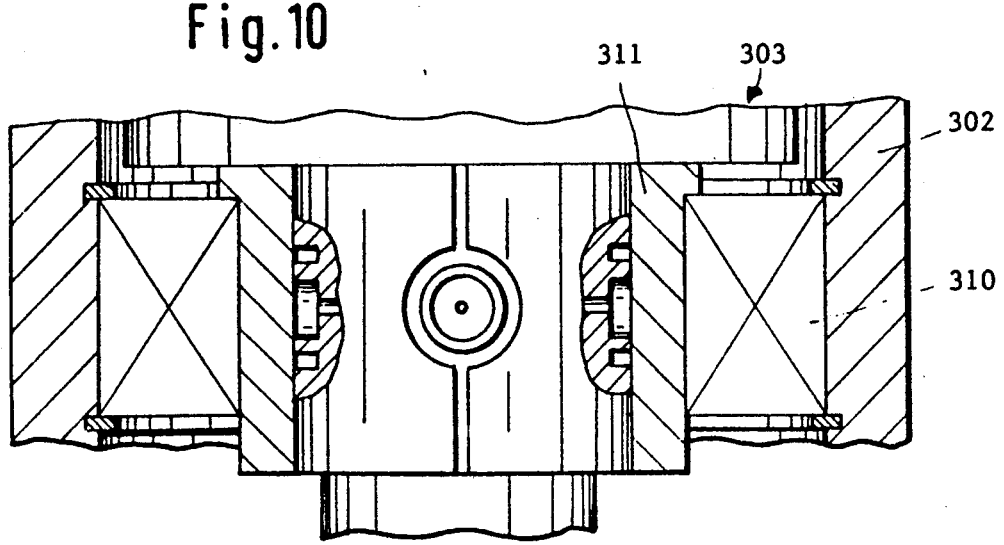
FIG. 10 is a fragmentary axial sectional view of the roll, sensors and carrier which are shown in FIG. 9.

FIGS. 9 and 10 show an apparatus wherein all such parts which are identical with or clearly analogous to the corresponding parts of the apparatus of FIGS. 1 and 2 are denoted by similar reference characters plus 300. This apparatus constitutes a modification of the apparatus of FIGS. 5 and 6. The difference is that the external surface 314 of the carrier portion 312 is provided with four circular pockets 315, 316, 38, 39 which are equidistant from each other in the circumferential direction of the inner race 311 and are respectively surrounded by annular grooves 317, 318, 40 and 41. The manner in which the pockets 38, 39 receive pressurized fluid (via channels 338a, 339a in the carrier 303) is preferably the same as the manner of supplying pressurized fluid to the pockets 315 and 316. The pressure of fluid in the channels 338a, 339a is monitored by a second monitoring circuit (not shown) which generates signals denoting the magnitude of transverse stresses acting upon the shell 302, i.e., the magnitude of stresses having a horizontal component as seen in FIG. 9. Signals from the second monitoring circuit can be used to counteract such transverse stresses.

An advantage of the apparatus of FIGS. 9 and 10 is that it can ascertain those stresses which act upon the shell 302 in a vertical plane (as seen in FIG. 9) as well as all stresses acting in a horizontal plane or having a horizontal component. This renders it possible to control any and all stresses upon the shell 302 with a high degree of accuracy.

Figure 11:
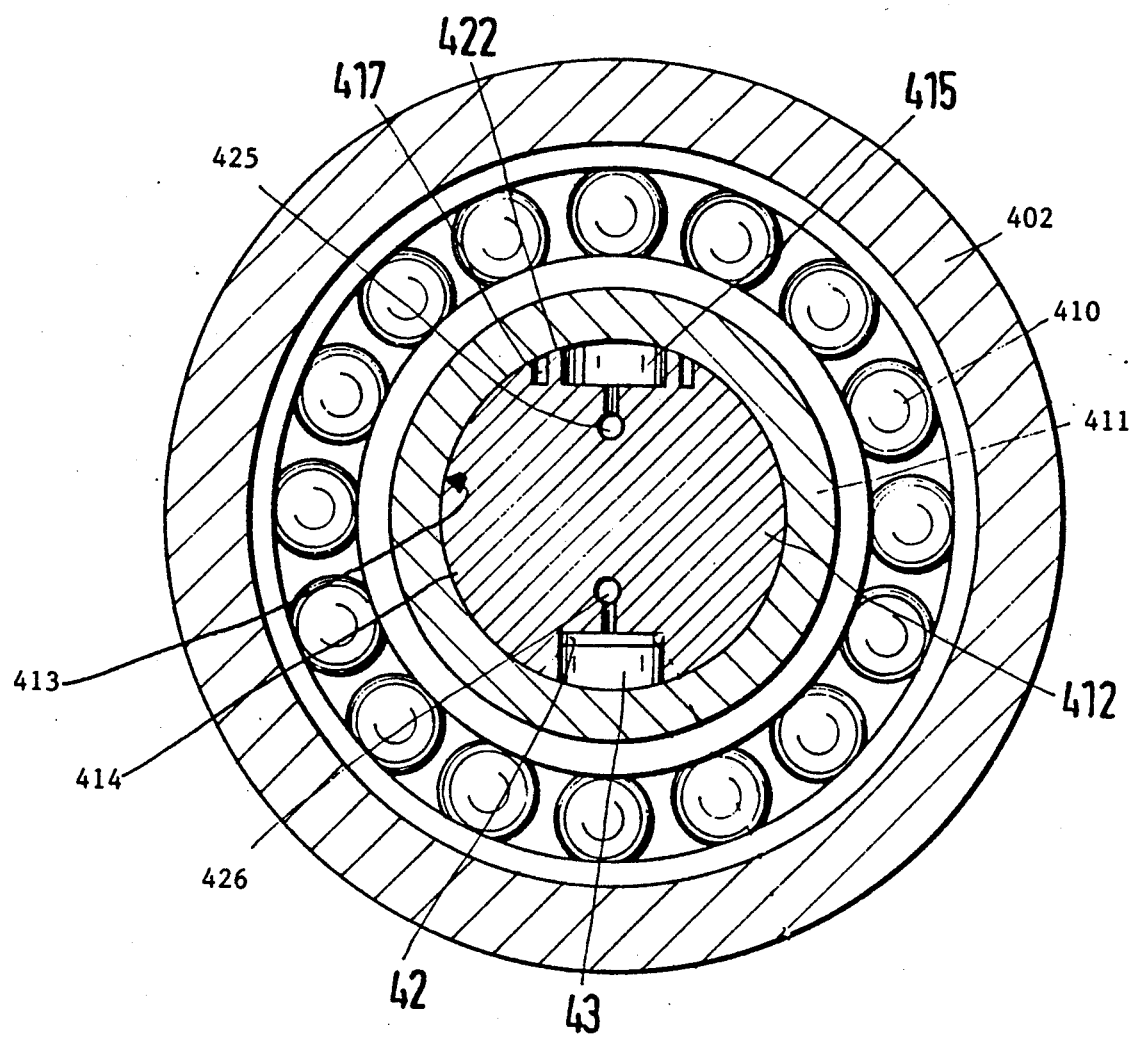
FIG. 11 is a fragmentary axial sectional view similar to that of FIG. 10 but showing a pair of different sensors.

FIG. 11 shows a portion of an apparatus wherein all such parts which are identical with or clearly analogous to corresponding parts of the apparatus of FIGS. 1 and 2 are denoted by similar reference characters plus 400. The pocket 415, the groove 417 and the clearance 422 shown in the upper half of FIG. 1 respectively correspond to the pocket 115, groove 117 and clearance 122 in FIG. 5. However, the plenum chamber in the lower half of FIG. 1 is a cylinder chamber 42 which extends radially of and is machined into the exernal surface 414 of the carrier portion 412, and the corresponding sensor further comprises a piston 43 which is reciprocable in the cylinder chamber 42 and is caused to bear upon the adjacent portion of the internal surface 413. The conduit 426 serves to supply pressurized fluid at a fixed pressure. This causes the piston 43 to bias the inner race 411 downwardly (as seen in FIG. 11) and to thus reduce the width of the clearance 422 with attendant rise of pressure in the circular pocket 415. The fluid which fills the pocket 415 tends to move the inner race 411 upwardly. When the shell 402 is stressed from above, such stress assists the pressure of fluid in the cylinder chamber 42 so that the width of the clearance 422 decreases with attendant rise of fluid pressure in the pocket 415. This establishes a state of equilibrium between the external stress and the bias of the piston 43 on the one hand, and the fluid pressure in the pocket 415 on the other hand. The corresponding monitoring circuit ascertains the rise of fluid pressure in the conduit 425, and its output signal is indicative of the stress upon the shell 402.

An advantage of the sensor which includes the cylinder chamber 42 and the piston 43 is that the piston can compensate for pronounced tolerances between the prescribed and actual diameters of the surfaces 413 and 414. This is in contrast with apparatus wherein each of two sensors which are disposed diametrically opposite each other includes a pocket; in such apparatus, the width of the clearance between the internal and external surfaces cannot exceed a predetermined maximum value.

As used herein the term "loose fit" or "clearance fit" is intended to embrace all kinds of fits which ensure that a shifting of the internal surface relative to the external surface and/or vice versa in the radial direction of such surfaces will entail a rise of pressure in a second chamber substantially diametrically opposite the first chamber. The fit can be in the micrometer range but can also be much more pronounced, especially if one of the sensors is designed in a manner as shown in the lower half of FIG. 11, i.e., with a plenum chamber in the form of a cylinder chamber receiving a radially movable piston acting upon that surface which is adjacent the open end of the cylinder chamber. Pronounced play between the internal and external surfaces does not affect the action of the respective bearing, i.e., the ability of such bearing to hold the respective end portion of a shell against excessive radial movements with reference to the adjacent portion of the carrier.

The improved apparatus can be used with equal or similar advantage to perform certain other desirable functions. For example, the apparatus can be used to ascertain the weight of a roll. This can be achieved when the roll is not acted upon by external stresses. Furthermore, the improved apparatus can be used with equal or similar advantage in conjunction with rolls which do not or need not have a deformable shell with one or more sets of hydrostatic or other supporting elements between the deformable shell and its carrier. For example, the apparatus can be used in conjunction with so-called intermediate or measuring rolls which are adjacent and cooperate with rolls having deformable shells. Intermediate or measuring rolls of such character are described, for example, in published German patent application No. 28 18 011 of Lehmann.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for ascertaining the magnitude of stresses acting upon a bearing wherein a substantially cylindrical internal surface is substantially coaxial with an surrounds with clearance a substantially cylindrical external surface in a roll having an elongated deformable shell surrounding a stationary carrier and being adapted to be stressed by fluid-operated supporting means extending longitudinally thereof, comprising a plurality of sensors including first and second sensors disposed between said surfaces substantially diametrically opposite each other and each including a plenum chamber, at least one of said chambers including at least one pocket provided in at least one of said surfaces; means for supplying pressurized fluid to said sensors, said surfaces defining a path for evacuation of fluid from said at least one pocket; and means for monitoring the pressure of fluid in said chambers and for regulating the pressure of fluid in said supporting means in dependency upon monitored fluid pressure in said chambers.

2. The apparatus of claim 1, further comprising means for collecting the fluid which leaves said at least one pocket by way of said path.

3. The apparatus of claim 1, wherein each of said plenum chambers includes at least one pocket, said surfaces defining paths for evacuation of fluid from said pockets, the cross-sectional area of one of said paths increasing when the crosssectional area of the other of said paths is reduced as a result of radial displacement of one of said surfaces relative to the other of said surfaces.

4. The apparatus of claim 1, wherein each of said plenum chambers includes a pocket and the effective area of one of said pockets equals or approximates the effective area of the other of said pockets.

5. The apparatus of claim 1, wherein said supplying means includes at least one source of hydraulic fluid.

6. The apparatus of claim 1, wherein said fluid supplying means includes means for delivering to each of said chambers a predetermined quantity of fluid per unit of time.

7. The apparatus of claim 1, wherein said fluid supplying means includes a discrete positive displacement pump for each plenum chamber having at least one pocket.

8. The apparatus of claim 1, wherein said fluid supplying means includes a positive displacement pump and flow divider means between said pump and said chambers.

9. The apparatus of claim 1, wherein said fluid supplying means includes a source of pressurized fluid and flow restrictors interposed between said source and each of said sensors.

10. The apparatus of claim 9, wherein said surfaces produce a first throttling action upon the flow of fluid along said path when said surfaces are coaxial and said flow restrictors produce a more pronounced second throttling action.

11. The apparatus of claim 1, wherein said surfaces are maintained in fixed angular positions relative to each other.

12. The apparatus of claim 1, wherein said at least one surface has a fluid-collecting groove which at least partially surrounds said pocket, said path extending between said pocket and said groove.

13. The apparatus of claim 1, wherein at least one of said surfaces has at least one groove which defines a portion of said path and further comprising means for receiving fluid from said at least one groove.

14. The apparatus of claim 1, wherein each of said chambers has a pocket and at least one of said surfaces has grooves which alternate with said pockets in the circumferential direction of said surfaces, said surfaces defining paths for evacuation of fluid from said pockets and each of said grooves defining a portion of one of said paths.

15. The apparatus of claim 1, wherein said pocket has a polygonal outline.

16. The apparatus of claim 15, wherein said pocket has a square or rectangular outline.

17. Apparatus for ascertaining the magnitude of stresses acting upon a bearing wherein a substantially cylindrical internal surface is substantially coaxial with and surrounds with clearance a substantially cylindrical external surface, particularly in a roll having a deformable shell surrounding a stationary carrier, comprising a plurality of sensors including first and second sensors disposed between said surfaces substantially diametrically opposite each other and each including a plenum chamber, at least one of said chambers including at least one pocket provided in at least one of said surfaces and another of said plenum chambers constituting a cylinder chamber, the sensor which includes said other chamber further comprising a piston which is reciprocable in said cylinder chamber; means for supplying pressurized fluid to said sensors, said surfaces defining a path for evacuation of fluid from said at least one pocket; and means for monitoring the pressure of fluid in said chambers.

18. The apparatus of claim 17, wherein said fluid supplying means includes means for admitting pressurized fluid into said cylinder chamber to thereby bias said piston against one of said surfaces.

19. Apparatus for ascertaining the magnitude of stresses acting upon a bearing wherein a substantially cylindrical internal surface is substantially coaxial with and surrounds with clearance a substantially cylindrical external surface on a stationary non-rotatable carrier in a roll having a deformable shell surrounding and being rotatable relative to the carrier, said internal surface being provided in a race non-rotatably surrounding the carrier and forming part of a bearing between the carrier and the shell, comprising a plurality of sensors including first and second sensors disposed between said surfaces substantially diametrically opposite each other and each including a plenum chamber, at least one of said chambers including at least one pocket provided in at least one of said surfaces; means for supplying pressurized fluid to said sensors, said surfaces defining a path for evacuation of fluid from said at least one pocket; and means for monitoring the pressure of fluid in said chambers.

20. Apparatus for ascertaining the magnitude of stresses acting upon a bearing wherein a substantially cylindrical internal surface is substantially coaxial with and surrounds with clearance a substantially cylindrical external surface, particularly in a roll having a deformable shell surrounding a stationary carrier, comprising a plurality of sensors including first and second sensors disposed between said surfaces substantially diametrically opposite each other and each including a plenum chamber, at least one of said chambers including at least one pocket provided in at least one of said surfaces, said at least one surface having a fluid-collecting annular groove which at least partially surrounds said pocket and said pocket having a substantially circular outline; means for supplying pressurized fluid to said sensors, said surfaces defining a path for evacuation of fluid from said at least one pocket and said path extending between said pocket and said groove; and means for monitoring the pressure of fluid in said chambers.

21. Apparatus for ascertaining the magnitude of stresses acting upon a bearing wherein a substantially cylindrical internal surface is substantially coaxial with and surrounds with clearance a substantially cylindrical external surface, particularly in a roll having a deformable shell surrounding a stationary carrier, comprising four sensors which are substantially equidistant from each other in the circumferential direction of said surfaces, said sensors including first and second sensors disposed between said surfaces substantially diametrically opposite each other and each of said sensors including a plenum chamber, each of at least two of said chambers including at least one pocket provided in at least one of said surfaces; means for supplying pressurized fluid to said sensors, said surfaces defining a path for evacuation of fluid from said pockets; and means for monitoring the pressure of fluid in said chambers, said monitoring means including a first monitoring device having means for monitoring the pressure in the chambers of two of said sensors and a second monitoring device having means for monitoring the pressure in the chambers of the other two sensors.

22. Apparatus for ascertaining the magnitude of stresses acting upon a bearing wherein a substantially cylindrical internal surface is substantially coaxial with and surrounds with clearance a substantially cylindrical external surface, particularly in a roll having a deformable shell surrounding a stationary carrier, comprising a plurality of sensors including first and second sensors disposed between said surfaces substantially diametrically opposite each other and each including a plenum chamber, at least one of said chambers including at least one pocket provided in at least one of said surfaces; an accumulator connected with said pocket; means for supplying pressurized fluid to said sensors, said surfaces defining a path for evacuation of fluid from said at least one pocket; and means for monitoring the pressure of fluid in said chambers.

23. Apparatus for ascertaining the magnitude of stresses acting upon a bearing wherein a substantially cylindrical internal surface is substantially coaxial with and surrounds with clearance a substantially cylindrical external surface, particularly in a roll having a deformable shell surrounding a stationary carrier, comprising a plurality of sensors including first and second sensors disposed between said surfaces substantially diametrically opposite each other and each including a plenum chamber, at least one of said chambers including at least one pocket provided in at least one of said surfaces; means for supplying pressurized fluid to said sensors, said surfaces defining a path for evacuation of fluid from said at least one pocket; means for monitoring the pressure of fluid in said chambers; and adjustable means for regulating the stresses between said surfaces, said monitoring means including means for adjusting said regulating means as a function of monitored pressure.

24. Apparatus for ascertaining the magnitude of stresses acting upon a bearing wherein a substantially cylindrical internal surface is substantially coaxial with and surrounds with clearance a substantially cylindrical external surface, particularly in a roll having a deformable shell surrounding a stationary carrier, comprising a plurality of sensors including first and second sensors disposed between said surfaces substantially diametrically opposite each other and each including a plenum chamber, at least one of said chambers including at least one pocket provided in at least one of said surfaces; means for supplying pressurized fluid to said sensors, said supplying means including at least one adjustable source of pressurized fluid and said surfaces defining a path for evacuation of fluid from said at least one pocket; and means for monitoring the pressure of fluid in said chambers, said monitoring means including means for adjusting said source as a function of monitored pressure.

* * * * *